United States Patent [19]

Gardner

[11] Patent Number: 5,473,637
[45] Date of Patent: Dec. 5, 1995

[54] OPEN-LOOP PHASE ESTIMATION METHODS AND APPARATUS FOR COHERENT DEMODULATION OF PHASE MODULATED CARRIERS IN MOBILE CHANNELS

[75] Inventor: Steven H. Gardner, San Diego, Calif.

[73] Assignee: Pacific Communication Sciences, Inc., San Diego, Calif.

[21] Appl. No.: 132,094

[22] Filed: Oct. 5, 1993

[51] Int. Cl.$^6$ .................................... H04L 27/22
[52] U.S. Cl. .................. 375/329; 375/326; 329/306
[58] Field of Search ................... 375/52, 47, 51, 375/57, 54, 83, 90, 99, 80; 329/300, 302, 304, 306, 345, 346

[56] References Cited

U.S. PATENT DOCUMENTS

| 4,466,108 | 8/1984 | Rhodes . | |
|---|---|---|---|
| 4,656,648 | 4/1987 | Vallet | 375/83 |
| 4,888,793 | 12/1989 | Chanroo et al. | 375/83 |
| 4,912,422 | 3/1990 | Kobayashi et al. | 375/83 |

FOREIGN PATENT DOCUMENTS

0533208A2 9/1992 European Pat. Off. .

OTHER PUBLICATIONS

1988 IEEE International Symposium on Circuits and Systems, "Digital Implementation of a Coherent CPM System for Mobile Radio" P. Eglin, J. Habermann, D. Dzung (IEEE 1988).

Electronics Letters, "Optimal Averaging Filter Length for Nondecision–Aided Feedforward Carrier Synchroniser" De Jonghe (Engage GB Feb. 1994).

Primary Examiner—Stephen Chin
Assistant Examiner—Don N. Vo
Attorney, Agent, or Firm—Blakely, Sokoloff, Taylor & Zafman

[57] ABSTRACT

Open-loop phase estimation methods and apparatus for coherent demodulation on mobile channels is disclosed. A PSK RF modulated signal is received, RF demodulated to obtain inphase and quadrature components thereof, and the inphase and quadrature components sampled and digitized periodically to provide inphase and quadrature components of the signal vector. A phase estimator strips the data contribution from each vector, leaving only a phase error measurement related to the true phase error. That phase error indication is averaged over a fixed window of time to determine an average phase estimate applicable to the signal vector at the middle of the window. Resulting one hundred eighty degree ambiguities are resolved, and then the applicable signal vector is phase corrected by the average phase estimate and result of the ambiguity resolution, with the following demodulation being responsive to the phase of the phase corrected signal vector.

16 Claims, 4 Drawing Sheets

OPEN-LOOP PHASE ESTIMATION METHODS AND APPARATUS FOR COHERENT DEMODULATION OF PHASE MODULATED CARRIERS IN MOBILE CHANNELS

BACKGROUND OF THE INVENTION

1. Field of the Invention

The present invention relates to the field of mobile digital communications, and more particularly, cellular communications.

2. Prior Art

Phase locked loop techniques (Costas loops) for tracking carrier phase and frequency do not work very well in the mobile channel because the phase change due to Rayleigh fading is so rapid that very wide loop bandwidths are required to track phase. The bandwidth required is so wide that performance in noise is so poor as to render the approach useless for all but the most slow moving vehicles.

A class of nonlinear estimation algorithms is described to estimate the unknown phase of a carrier which is fully modulated by m-ary phase shift keying (PSK) modulation in "Nonlinear Estimation of PSK-Modulated Carrier Phase with Application to Burst Digital Transmission", IEEE Transactions on Information Theory, vol. IT-29, No. 4, July 1983. This technique has been used in burst digital transmission modems for military applications.

BRIEF SUMMARY OF THE INVENTION

Open-loop phase estimation methods and apparatus for coherent demodulation on mobile channels is disclosed. A PSK RF modulated signal is received, RF demodulated to obtain inphase and quadrature components thereof, and the inphase and quadrature components sampled and digitized periodically to provide inphase and quadrature components of the signal vector. A phase estimator strips the data contribution from each vector, leaving only a phase error measurement related to the true phase error. That phase error indication is averaged over a fixed window of time to determine an average phase estimate applicable to the signal vector at the middle of the window. Resulting one hundred eighty degree ambiguities are resolved, and then the applicable signal vector is phase corrected by the average phase estimate and result of the ambiguity resolution, with the following demodulation being responsive to the phase of the phase corrected signal vector.

DETAILED DESCRIPTION OF THE INVENTION

The preferred embodiment of the present invention is a mobile data base station having a particular form of open loop phase estimator for coherent tracking of Gaussian minimum shift keying (GMSK) signals as used in the Cellular Digital Packet Data network. This Cellular Digital Packet Data network shares the transmission facilities of existing Advanced Mobile Phone System (AMPS) cellular telephone networks. However it is to be understood that the same general system can be used for other phase modulations such as BPSK, QPSK, OQPSK, π/4 shifted DQPSK, MSK, tamed-FM, or LRC.

Figure 1:
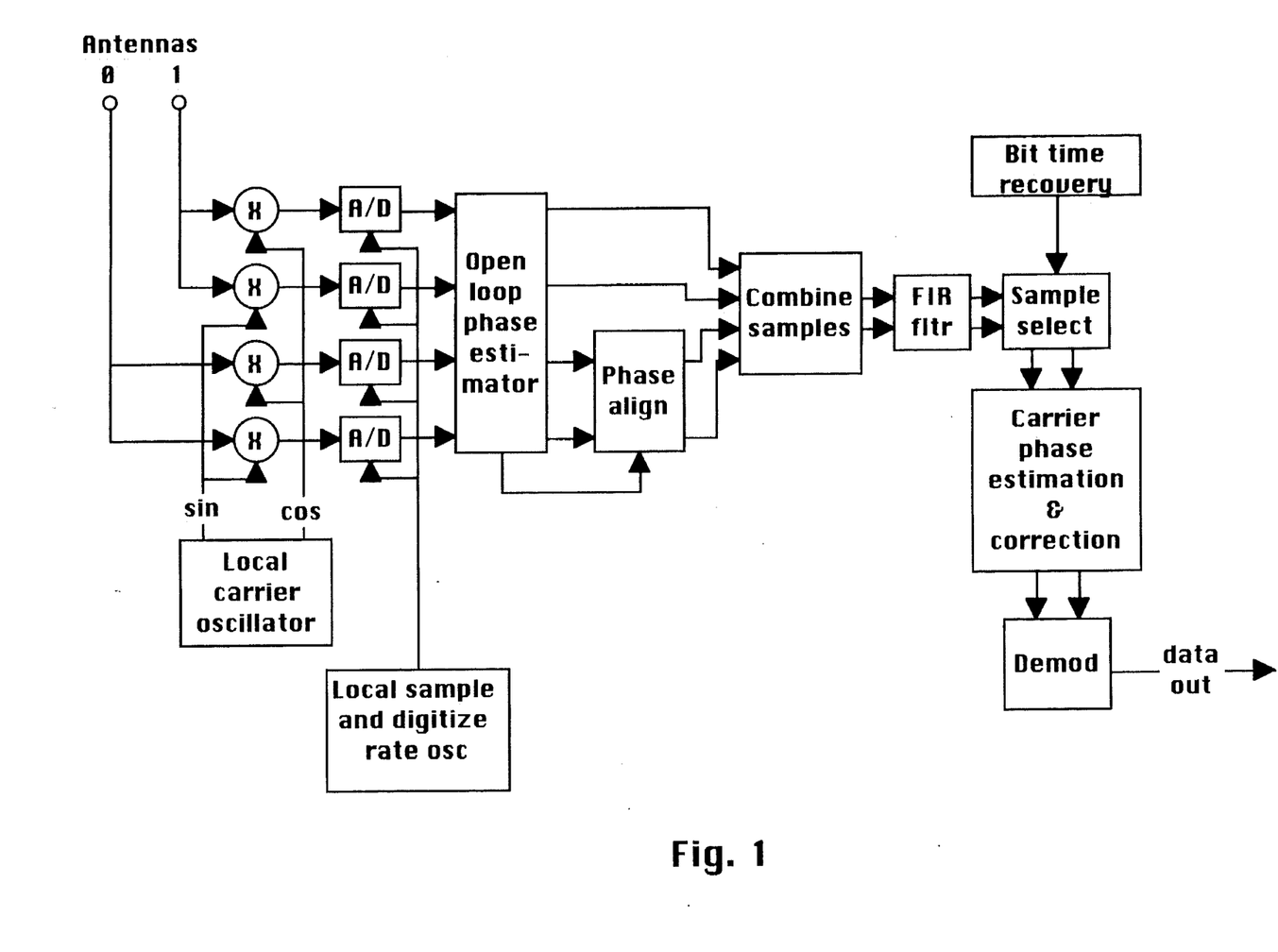
FIG. 1 is a block diagram of a preferred embodiment cellular radio receiver for receiving phase shift keyed digital information modulated on an RF carrier incorporating the present invention and using spatially diverse antennas.

Referring to FIG. 1, a block diagram of the receiver portion of a cellular radio used for mobile data communications and incorporating the present invention may be seen. While the system shown in the Figure may be used at the mobile units, it is particularly suitable for data base stations used in a mobile communications system. Also it is to be understood that certain aspects of the system shown are representative of the preferred embodiment only, and that alternate embodiments of various designs and configurations may also incorporate the present invention. By way of only one such example, the embodiment shown utilizes spatially diverse antennas for enhanced resistance to fading, characteristic of the preferred embodiment, but by no means required in other embodiments incorporating the invention.

As shown in FIG. 1, in this embodiment, two spatially diverse antennas 0 and 1 are used, the antennas being spaced far enough apart so that the signal fading experienced by each antenna is substantially independent of the fading experienced by the other antenna. The RF signals received on the two antennas are RF demodulated by inphase and quadrature components of a local carrier oscillator. This demodulation provides inphase and quadrature analog signals for each of the two antennas. The phase of the RF demodulated signal for each antenna will depend not only on the information bearing portion of the phase of the signal, but also the contribution due to phase changes caused by the channel, including the difference in frequency between the local carrier oscillator and the transmitter oscillator, and the contribution of the intersymbol interference and receiver front end noise and other interference. With respect to the information bearing portion of the phase and the difference in frequency between the local and the transmitter oscillator, these will be substantially identical for the two antennas, as the separation of the antennas is large with respect to the wavelength of the RF signal, but is very small compared to an equivalent wavelength based upon the bit rate. Components of phase in the RF demodulated signals from the two antennas other than the information bearing portion and oscillator differences will be relatively independent for the two antennas.

The inphase and quadrature components of the RF demodulated signals from the two antennas are sampled at an appropriate multiple of the bit rate (typically four times the bit rate) of the channel under control of a local oscillator, and digitized. The digitized inphase and quadrature components of each of the two signals then undergo a series of operations, many of which can be carried out in a processor under program control, such as by a Texas Instruments TMS 320, or alternatively a more conventional microprocessor. However, for purposes of FIG. 1, the various major functions are illustrated in separate blocks, representing the signal processing, but not necessarily the hardware organization for accomplishing the same. If desired, the functions may instead be achieved in a hardware form.

The inphase and quadrature components of the two signals in digital form first undergo a phase difference detection wherein on a sample by sample basis, a good estimate of the actual phase difference between the two signals is obtained. This phase difference is used to phase align the two digitized signal vectors, in the specific embodiment being described by shifting the phase of the vector represented by the inphase and quadrature components of the signals derived from antenna 0 to be inphase with the corresponding vector represented by the digitized components of the signal for antenna 1. This allows the combining of the samples as shown, in the preferred embodiment by adding the same, though of course other methods of combining may also be used as desired. Details of the foregoing use of spatially diverse antennas and the method of co-aligning the two signal vectors prior to combining the same are disclosed in my copending application entitled "Open Loop Phase Estimation Methods and Apparatus for Coherent Combining of Signals using Spatially Diverse Antennas in Mobile Channels", filed Oct. 5, 1993 as Ser. No. 08/132,091.

Figure 2:
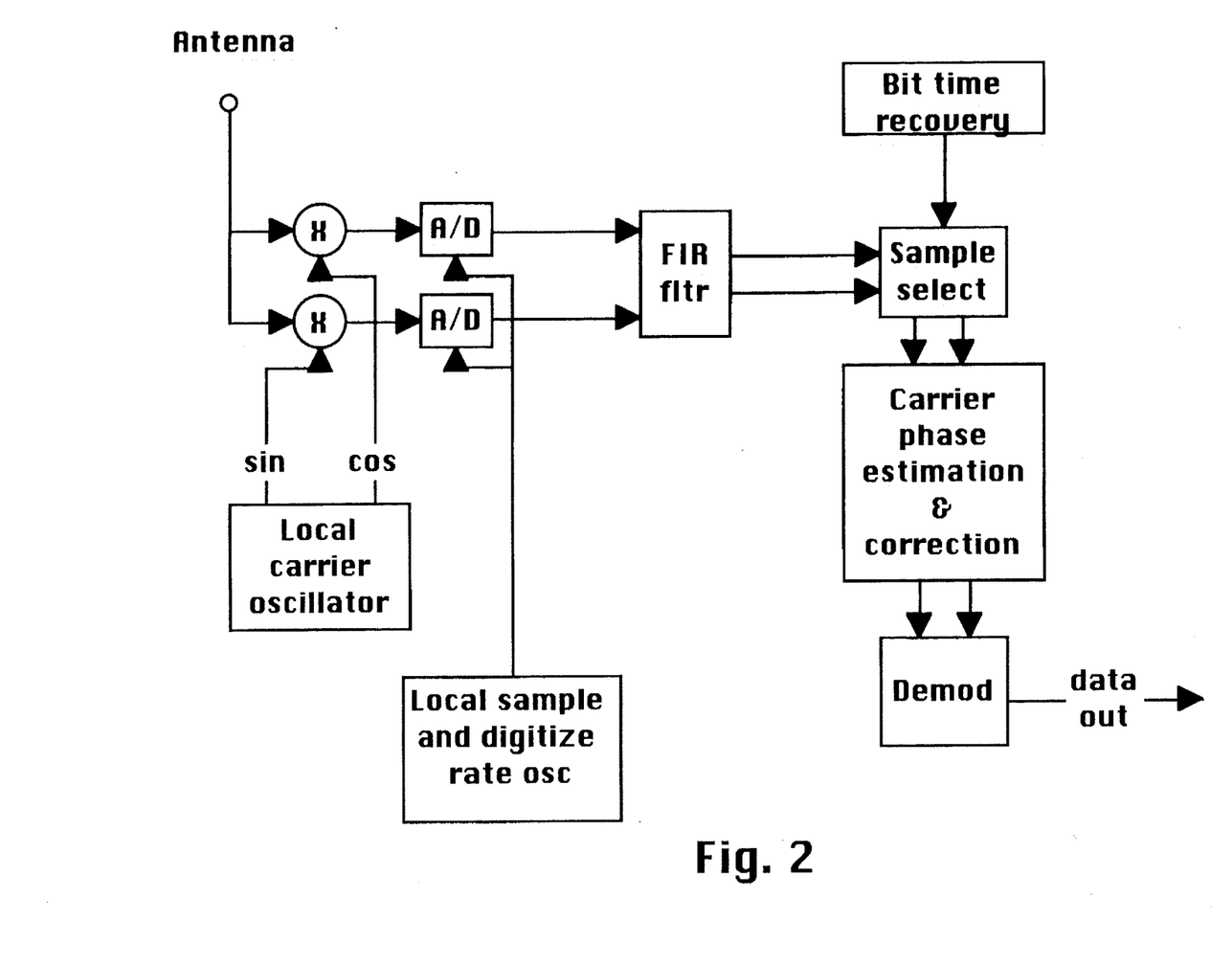
FIG. 2 is a block diagram of an alternate embodiment, simplified cellular radio receiver for receiving phase shift keyed digital information modulated on an RF carrier incorporating the present invention, but without using spatially diverse antennas.

FIG. 2 shows an alternate embodiment, namely one utilizing a single antenna. Here the spatial diversity is not provided, but also the system is simplified, as the inphase and quadrature components of the signal vector are directly provided without having to align and combine two vectors. Such a configuration could be used at a base station, though may find greater application at the mobile unit where spatially diverse, multiple antennas may be impractical or impossible to use.

In any event, the result of combining the inphase and quadrature components of the two signals is a single digitized inphase and a single digitized quadrature signal representing the single signal vector for the combined signals from the two antennas, thereby providing the desired spatial diversity in the inphase and quadrature components of the single signal vector. These digitized signals, taken at approximately four times the bit rate, are each digitally filtered in the preferred embodiment by finite impulse response filtering to provide the corresponding filtered inphase and quadrature components for demodulation and bit time recovery. In the preferred embodiment, since the sample rate for digitizing is approximately four times the bit (symbol) rate, there will always be one sample set (inphase and quadrature components for the combined signal vector) which is no more than one eighth of a bit time away from the center of the bit time, and accordingly the corresponding sample set may be selected for demodulation to provide sufficient accuracy in the data output. In other embodiments, a different sampling rate and/or selection method may be used. In the preferred embodiment, to advance or retard the sample selection from the normal one in four, as required to make up for the inevitable but relatively small difference between the actual bit rate of the received signal and the corresponding local oscillator frequency divided by four, the recovered bit time is used as a reference to control the sample selection as required. Various methods are well known for timing recovery itself, and accordingly details of timing recovery methods are not described herein.

The received phase for a given symbol can be represented as:

$$\phi_n = \theta_n + N_n + \Psi_n$$

where:

$\phi_n$ is the received phase $\theta_n$ is the information bearing portion of the phase (taking on nominal values 0 or 180 degrees on even bit times and 90 and 270 degrees on odd bit times)

$N_n$ is the contribution of intersymbol interference and receiver front end noise (and other interference)

$\Psi_n$ is the contribution due to error between the local oscillator in the receiver and the phase of the received signal, which is caused by the combination of the phase changes caused by the channel and the difference between the transmitter and receiver oscillator phase and frequency.

In vector form, the received symbol is given by $(I_n, Q_n)$, where:

$$I_n = \sqrt{A_n} \cos \phi_n$$

$$Q_n = \sqrt{A_n} \sin \phi_n,$$

and $A_n$ is the power of the received vector

Many types of phase modulation exist and are in common usage in the industry. Phase modulations used for data carry the data information in the phase of the carrier signal. For simple modulations, only one bit of data is transmitted at a time and the phase can take on one of two values at a given time. Modulations in which one bit is sent in a given signaling period are referred to as "binary" modulations. For more complex modulations, multiple bits can be transmitted at a time. For example, Quadrature Phase Shift Keying modulation (QPSK) allows the transmission of one of four phases at a given bit time. This modulation is thus "quaternary".

In Binary Phase Shift Keying (BPSK), QPSK, Offset QPSK (OQPSK) and π/4-shifted QUPSK (as used in IS-54 type cellular telephony), the transmitter sends a particular phase for each possible bit for the duration of the bit time. A second class of phase modulations, often referred to as Continuous Phase Modulations, use the data to cause continuous transitions from one phase to another during the course of one or more bit times. Examples of such modulations are Minimum Shift Keying (MSK), Gaussian shaped MSK (GMSK), tamed FM, and L-ary Raised Cosine modulation (LRC). These modulations can in general be characterized by the expression:

$$s(t) = A \cos \left( 2\pi f_c t + 2\pi h \sum_{i=-\infty}^{\infty} \alpha_i \int_{-\infty}^{t} g(\tau - iT) d\tau \right)$$

where A is the signal amplitude, $f_c$ is the carrier frequency, h is the modulation index, $\alpha_i$ are the data symbols (which are typically +/−1 for binary modulations but may take on more values for more complex modulations), and g(t) is the frequency pulse that characterizes the modulation. As an example, for binary MSK, g(t) is a rectangular pulse of duration T and amplitude 0.5. Thus a given data bit input to an MSK modulator results in a linear phase change of either +/−90 degrees over one bit time.

The text Digital Phase Modulation (J. B. Anderson, T. Aulin, C. E. Sundberg, Plenum Press 1986) discusses many such modulations on pages 50–53. The concepts of this patent apply to all of these phase modulations as well as the more simple BPSK, QPSK, OQPSK, and π/4 shifted QUPSK and its variants.

An essential component of this patent is the conversion of a vector that represents the phase of the received signal into one that has no contribution from either the data or the modulation, but only a contribution due to the phase error between the local reference and the received signal. To remove the contributions of the data and modulation requires various operations, depending on the exact modulation scheme used. An exhaustive presentation of this operation for all modulations is not practical, but the concepts required are illustrated below and their extensions to modulations not discussed in detail are obvious and are within the scope of this patent.

The discussion in this patent concentrates on an application using binary GMSK ($\alpha_i$ are either +/−1 with BT=0.5 and h=0.5), but the patent also applies to all the other modulations discussed and the principles may be extended to these.

The extension is achieved as follows: depending on the modulation, the phase at a given bit time may be dependent on just one transmitted bit (or symbol, for non-binary modulations), or it may depend on several bits (this the case for many classes of continuous phase modulation). In the former cases, for binary modulations there are only two choices for the phase at a given bit time, although it may be that the two choices are different depending on exactly which bit time is being considered (for example, in MSK, on even bit times the phases can be 0 or 180 degrees, while on odd bit times they can be +/−90 degrees). If the modulation is antipodal (meaning that the two possible phases are always separated by 180 degrees) then squaring the vector removes the data contribution to the phase because regardless of whether a one or a zero was sent, the resulting vector is the same. The result may differ from one bit to the next because of the modulation, but this effect is easily removed as well (for example, in MSK the squared vectors are alternately 180 degrees out of phase, so simply inverting alternate vectors aligns all of them).

For more complex continuous phase modulations such as GMSK, the phase at each bit time may be affected by several data bits. However, in general it is adequate to assume that the phase is predominantly affected by just one bit and that the effects of the other bits is a noise term. For the purposes of this patent, these effects are actually less than if they were noise, because they prove to be almost completely self canceling when averaged according to the procedures described herein. Thus binary GMSK with h=0.5 and BT=0.5 can be treated in the same fashion as binary MSK with h=0.5. The same applies for LRC and tamed-FM modulations with comparable deviations. If the deviation is such that the modulation is no longer antipodal, then a higher power operation than squaring may be required.

For quaternary modulations, removing the data requires a fourth power operation rather than a squaring. For π/4 shifted QPSK, for example, the result of this operation will be (in the absence of noise or carrier error) 0 for odd bit times and 180 degrees for even bit times. As for MSK, this ambiguity is easily removed by inversion of alternate results.

Figure 3:
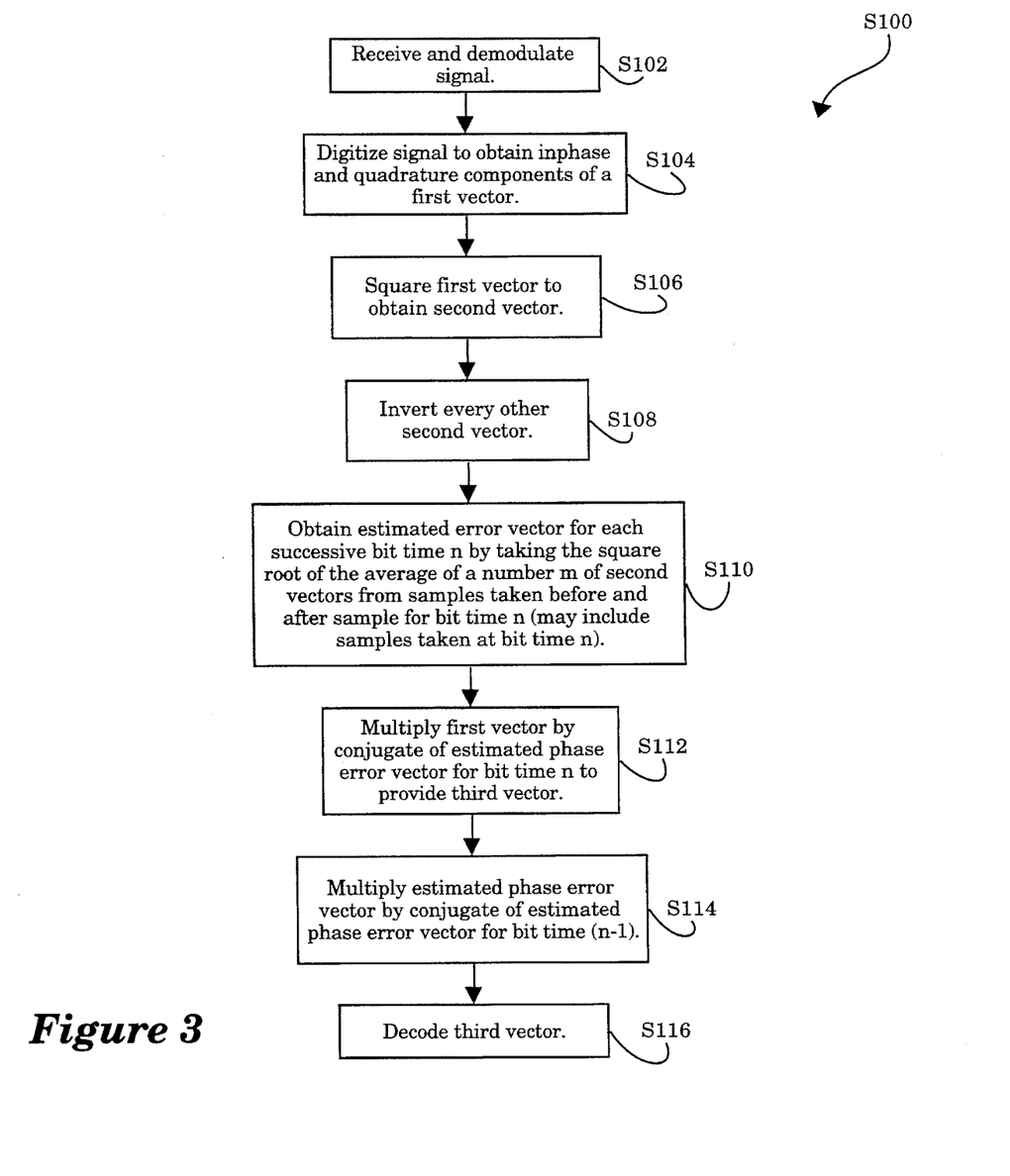
FIG. 3 is a flow chart of a preferred embodiment of the method of the present invention.
Figure 3A:
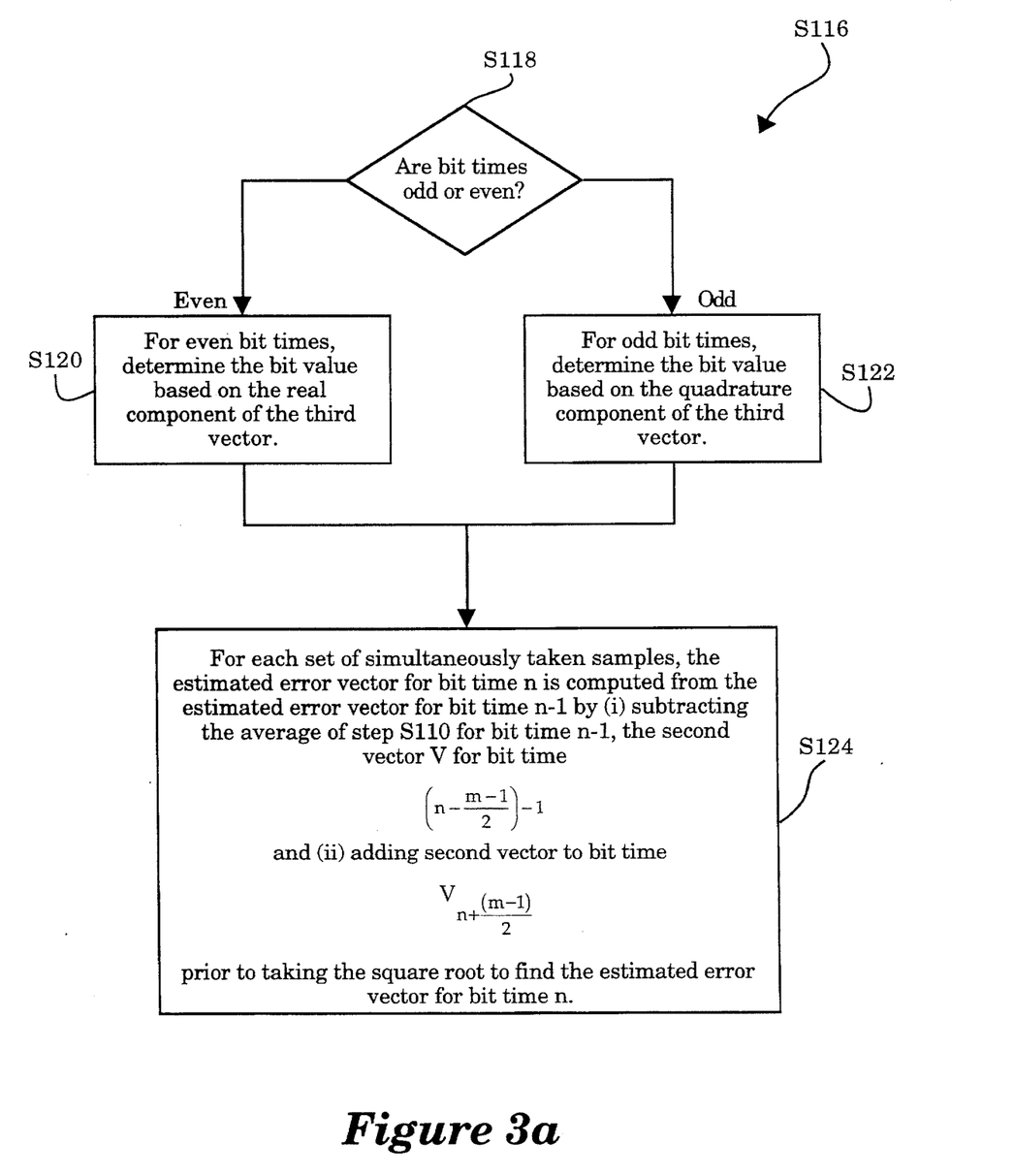
FIG. 3A is a flow chart illustrating details of step S116 of FIG. 3.

FIG. 3 is a flowchart of a preferred embodiment of the method S100 of the present invention. FIG. 3a is a flowchart illustrating details of step S116 in FIG. 3. The phase estimator begins for binary modulations such as BPSK, MSK, GMSK, or LRC by squaring (S106) (for quaternary modulations such as QPSK, OQPSK or π/4 shifted DQPSK a fourth power operation is required) the received signal vector (S102, S104) which in essence doubles (four times for quaternary modulations) the received phase and squares (fourth power for quaternary modulations) the amplitude. The resulting vector for binary modulations has phase:

$$\omega_n = 2\phi_n = 2\theta_n + 2N_n + 2\Psi_n = \gamma_n + 2N_n + 2\Psi_n$$

where:

$\gamma_n$ is deterministic and depends on the modulation used. For example, for the preferred embodiment of 0.5 BT GMSK with modulation index=0.5, $\gamma_n$ is 0 for even bit times and 180 for odd bit times.

Thus:

$$(I_n, Q_n)^2 = (A_n \cos \omega_n, A_n \sin \omega_n)$$

The contribution of $\gamma_n$ is easily stripped off. For the preferred embodiment of π/4 shifted DQPSK or for BMSK, MSK, and LRC with modulation index 0.5), this is done by inverting alternate values of the vector, leaving a vector (S108) $(X_n, Y_n)$ whose phase is $2N_n + 2\Psi_n$ and whose amplitude is $A_n$. For BPSK, QPSK, OQPSK or for MSK, GMSK and LRC with modulation index 1.0, no inversion is performed. For still other phase modulation techniques, $\gamma_n$ can take on other (predetermined) values. In any event, $\gamma_n$ acts as a phase offset between vectors adjacent in time, and may be removed by an appropriate vector rotation to remove the offset. The simple inversion of every other vector in the preferred embodiment is just such a vector rotation, as the offset between adjacent vectors in this case is 180 degrees, and the inversion of every other vector is a rotation of the 180 degree vectors to align to the zero degree vectors.

By taking the square root of the vector $(X_n, Y_n)$ (S110), one could produce a vector whose phase approximates the phase error. This estimate is not very good if $N_n$ is of substantial size, which it will be for most practical systems. However, if the assumption is made that $\Psi_n$ is linear with n over some time interval of m symbols, and that $N_n$ has mean zero, then the vector $(W_n, Z_n)$ formed by normalizing the vector square root of the vector sum of a list of m consecutive values of $(X_k, Y_k)$ for $$k = n - (m - 1)/2 \text{ to } k = n + (m - 1)/2$$

has a phase that is a good estimate of the value of $\Psi_n$ in the middle of the list, because the signal to noise ratio of the estimate is reduced by a factor equal to the number of samples averaged. Note that m is an odd integer, as m includes a number of symbols preceding the symbol in question, an equal number of symbols following the symbol in question and the symbol in question itself. As an alternative, m could be an even number and the current symbol vector left out of the averaging calculation, as this provides for the averaging of samples for an equal number of bit times before the sample in question with an equal number of bit times after the sample in question. The square root is used as described above for binary modulations such as BPSK, MSK, GMSK, or LRC. The vector fourth root of the error vector formed above is used for quaternary modulations such as QPSK, OQPSSK or π/4 shifted DQPSK.

The parameter m is chosen to provide the best balance between the approximation of the linearity of $\Psi_n$ with n and the desired reduction in signal to noise ratio (SNR) of the estimate vector, $(W_n, Z_n)$. If the vector $(I_n, Q_n)$ is multiplied by the conjugate of $(W_n, Z_n)$ (S112) (which can be easily done by forming the vector product $(I_n, Q_n)*(W_n, -Z_n)$), then the resulting vector has phase $\theta_n + N_n$, which is the desired result, namely that the effects of differences between the receiver local oscillator and the received signal have been removed.

There is one more step that needs to be considered. When $(W_n, Z_n)$ was computed above, an ambiguity is produced in the result, namely that for binary modulations, it is not clear whether the resulting phase correction should lie in the range from 0 to 180 degrees or from 180 to 360 degrees. This is because prior to the square root operation, the vector must lie within the span from 0 to 360 degrees, and thus when its angle is halved in the square root operation, the result necessarily lies within 0 to 180 degrees, whereas clearly values from 180 to 360 are equally likely. For quaternary modulations, the ambiguity is between 0, 90, 180 and 270 degrees.

The foregoing problem is resolved by looking at the phase difference between ($W_n,Z_n$) and ($W_{n-1},Z_{n-1}$). This can be done by forming the vector product ($W_n,Z_n$)*($W_{n-1},-Z_{n-1}$) and for binary modulations, checking to see if the difference is more than 90 degrees or less than −90 degrees (which is easily done by checking to see if the real part of the vector product is negative) (S114). Under normal circumstances the symbol to symbol phase error will not be this big, so it can be assumed that a difference greater than 90 degrees occurred because the actual phase error crossed from the 0 to 180 degree range into the 180 to 360 degree range or vice versa. Keeping a modulo-2 sum of the number of times a difference greater than 90 degrees occurs, the corrected vector can be formed by using ($I_n,Q_n$)*($W_n,-Z_n$) when the modulo-2 sum is 0 and by using ($I_n,Q_n$)*($-W_n,Z_n$) when the modulo-2 sum is 1. For quaternary modulations, 90 degrees is added if the difference is greater than 45 degrees or less than −45 degrees.

The corrected vector that results from this operation has an ambiguity of 180 degrees for antipodal modulations. This can be removed by the usual technique of using differential coding and decoding (S116). In the case that the transmitted signal was GMSK or MSK, the signal may be inherently differential so that no differential encoding is needed; only differential decoding.

In a preferred embodiment, the method of decoding the vector includes the steps of: (i) for even bit times, determining the bit value based on the real component of the vector (S120); (ii) for odd bit times, determining the bit value based on the quadrature component of the vector (S122). In addition, for each set of simultaneously taken samples, the estimated error vector for bit time n is computed from the estimated error vector for bit time n−1 by (i) subtracting from the average of step S110 for bit time n−1, the second vector for bit time $$\left( n - \frac{m-1}{2} \right) - 1,$$

and (ii) adding the second vector $$V_{n+(m-1)/2}$$

prior to taking the square root to find the estimated error vector for bit time n (S124).

The phase estimation and correction technique described requires that the frequency error be reasonably small (the phase should not change by much more than 10% of a full cycle over the length of the averaging). For situations with larger frequency errors, a frequency control circuit should precede the phase estimator to reduce the residual frequency error to within this range.

For symbol rates that are useful in mobile data channels (10 ksym/sec or greater), this system works quite well in Rayleigh fading environments where the Doppler rate is up to 100 Hz or so, which means that it can be used to perform coherent demodulation of data signals for both U.S. cellular communications and for European GSM.

In the preferred embodiment hereinbefore described, the number of samples used in the phase estimate is predetermined at 25, though of course other predetermined numbers of samples could also be used. In that regard, the larger the number of samples used, the smaller the frequency error must be. On the other hand, the lower the number of samples used, the less noise will be reduced by averaging. As an alternative to using a predetermined number of samples, the number of samples may be made adaptive, responding to some characteristic or characteristics of the communication channel within some limits to optimize in some way the number used under the then current conditions. Thus, while the present invention has been disclosed and described with respect to certain preferred embodiments thereof, it will be understood to those skilled in the art that the present invention may be varied without departing from the spirit and scope of the invention.

Appendix 1

```
c     The following is an MS-FORTRAN routine for performing coherent
c     demodulation of GMSK
      psumi=0.            ! initialize phase estimator accumulators
      psumq=0.
      even=1              ! initialize even/odd bit time counter
      plen=25             ! length of phase estimator; a parameter
      start=start−plen/2  ! start phase estimation plen/2 before first
                          ! desired data bit
      stop=stop+plen/2    ! stop phase estimation plen/2 after last
                          ! desired data bit
      do 740 i=0,127
         sqri(i)=0.       ! initialize array of squared phase vectors
740      sqrq(i)=0.
      do 750 i=start,stop         ! loop over all data bits;
         i1=mod(i,128)            ! index for new phase vector
         i2=mod(i1+128−plen,128)  ! index for back end of sliding window acc
         i4=i−int((plen+1)/2)     ! index for phase to apply correction to
c     matched filter
c
c     si( ) and sq( ) are the streams of received samples to be filtered and phase
c     corrected. mf( ) is the taps of the receiver FIR filter (could also be an IIR . . .
c     this filter is not critical to the phase estimation algorithm).
c
```

-continued

Appendix 1

```
c       convolve si( ) with mf( ) to get flti( ) and sq( ) with mf( ) to get fltq( ). Assumes
c       there are four samples per symbol; this also is not critical to the phase estimator.
            flti(i)=0.
            fltq(i)=0.
            do 760 k=0,14
                k1=i*4−k
                flti(i)=flti(i)+mf(k)*si(k1)
760             fltq(i)=fltq(i)+mf(k)*sq(k1)
c       phase estimator
c
c       the phase estimator performs the following main jobs:
c           1. strip the data contribution from each vector, leaving only a value
c               related to the phase error (plus noise, and ISI . . . these will average out)
c           2. average the phase error over a fixed window of time
c           3. "unwrap" the phase error . . . resolve 180 degree ambiguities that result
c               from steps one and two
c           4. correct the received sample with the estimate of the phase and make
c               decisions
c
c       first step: strip the data
c
c       if we think of the signal as MSK with no timing error, ISI, noise, frequency, or phase
c       error, then on even bit times a 0 or 180 degree phase is sent while on odd bit times
c       +/−90 is sent. If we double the received phase (by squaring the vector) we always get
c       on even bit times and always get 180 on odd bit times. If we invert all the odd results
c       after squaring, we always get zero for all of them. If there is a phase error (due to
c       any of the degradations that we just assumed weren't there), the resulting
c       vector has twice the phase error in it. If we average over some number of symbols we
c       smooth out the effects of noise and ISI to some extent. Moreover, in the presence of
c       a constant frequency error, the average over 2n−1 symbols is a good estimate of twice
c       the phase error present in the nth symbol.
            sqri(i1)=even*(flti(i)**2−fltq(i)**2)/65536.
            sqrq(i1)=even*(2*flti(i)*fltq(i))/65536.
            even=−even          !   even goes +/−/+/−1
c       second step: average the phase vectors
c
c       this is done with a sliding window accumulator. We want to sum up the last plen phase
c       vectors. Rather than adding plen vectors every symbol, we keep a running sum and add
c       the newest vector and subtract off the one that's plen+1 symbols old. After averaging
c       we have to extract the phase estimate by doing a vector square root, since the
c       average is an estimate of the square of the error vector.
            psumi=psumi+sqri(i1)−sqri(i2)                           !   update the averager
            psumq=psumq+sqrq(i1)−sqrq(i2)
            phai=sqrt((psumi+sqrt(psumi**2+psumq**2))/2)            !   real part of vector square
                                                                    !   root
            phaq=sqrt((−psumi+sqrt(psumi**2+psumq**2))/2)           !   imaginary part of
                                                                    !   vector square rootc
c       third step: unwrap the phase estimate
c
c       In unwrapping, the issue is that because we have averaged the squares of
c       the vectors and then taken the square root, the result we will get is a vector that has
c       phase somewhere between 0 and 180 degrees. So if we had a constant frequency error
c       the estimator would output a correction vector that goes . . . 177,178,179,0,1,2 . . . degrees
c       when it ought to go . . . 177,178,179,180,181,182 . . . degrees. This is bad because it causes
c       periodic sign flips in the demodulated data. To fix this, we have to decide when the
c       vector has done such a jump, or in essence, if the difference between successive vector
c       outputs is more than 90 or less than −90 degrees, we conclude that we have "wrapped"
c       and we add 180 degrees to the output of the estimator from this point on. We make the
c       decision on the wrapping by means of dividing vectors. If the real part is
c       positive then the phase change is in the right half plane, so no unwrapping.
            xtmp=phai*phaiold+phaq*phaqold
            if(xtmp.lt.0) wrapiq=mod(wrapiq+1,2)
            phaiold=phai
            phaqold=phaq
            m=m+1
            if(m.lt.plen) goto 750          !   still getting phase estimator primed
c
c       fourth step: correct the received symbol and make decisions
c
c       Correct the phase of the received symbol by multiplying it by the conjugate of the phase
c       estimate vector. Make decision for even bits by looking at the real part and for odd bits
c       using the imaginary part. Invert the decisions based on the status of the unwrapping bits.
            if(even.eq.1) then
                xtmp=(flti(i4)*phai+fltq(i4)*phaq)/65536.           !   real part if even
            else
                xtmp=(fltq(i4)*phai−flti(i4)*phaq)/65536.           !   otherwise imaginary part
            endif
```

Appendix 1 (continued)

```
                    if(wrapiq.eq.1) xtmp=-xtmp
                    decide=0
                    if(xtmp.gt.0) decide=1
            if(dec1.ne.decide) then       !   differential decode over one bit time
                    if(even.eq.1) then
                            dec(i4)=1
                    else
                            dec(i4)=0
                    endif
            else
                    if(even.eq.1) then
                            dec(i4)=0
                    else
                            dec(i4)=1
                    endif
            endif
            dec1=decide
750     continue
```

I claim:

1. In a ground based mobile channel, a method of coherent recovery of phase in a phase shift keyed digital signal modulated on a carrier comprising the steps of:

(a) receiving the phase shift keyed signal modulated on a carrier and demodulating the signal using a local oscillator signal as a reference to provide inphase and quadrature components of the demodulated signal;

(b) providing digitized samples of the inphase and quadrature components of the demodulated signal of step (a) representative of the demodulated signal at each bit time to provide digitized inphase and quadrature components of a first vector having a phase responsive to (i) an information-bearing phase component of the received signal, (ii) the phase difference between the local oscillator signal and the carrier of the received signal, and (iii) interference and noise;

(c) squaring the first vector to provide a second vector having twice the phase angle of the first vector;

(d) inverting every other second vector by inverting the second vector every odd bit time;

(e) for each successive bit time n, finding an estimated error vector by taking the square root of the average of an odd number m of successive second vectors $$V_{n-(m-1)/2}$$

through $$V_{n+(m-1)/2}$$

using where applicable the inverted vectors of step (d);

(f) multiplying the first vector $V_n$ of step (b) for each bit time n and the conjugate of the estimated phase error vector of step (e) for bit time n to provide a third vector;

(g) multiplying the estimated phase error vector of step (e) for bit time n by the conjugate of the estimated phase error vector of step (e) for bit time n−1 to at least find the sign of the real part of the vector product;

(h) decoding the third vector for each bit time to obtain a bit of data, including inverting the respective bit if the real part of the vector product of step (g) is negative.

2. The method of claim 1 wherein the number m is a predetermined number.

3. The method of claim 1 wherein the number m is adaptively determined based on at least one detected characteristic of the mobile channel.

4. The method of claim 1 wherein the mobile channel is a Gaussian minimum shift keying digital communication channel.

5. The method of claim 4 wherein the step of decoding the third vector includes the steps of:

(k) for even bit times, determining the bit value based on the real component of the third vector;

(l) for odd bit times, determining the bit value based on the quadrature component of the third vector.

6. The method of claim 5 wherein, for each set of simultaneously taken samples, the estimated error vector for bit time n is computed from the estimated error vector for bit time n−1 by (i) subtracting from the average of step (e) for bit time n−1, the second vector V for bit time $$\left( n - \frac{m-1}{2} \right) - 1,$$

and (ii) adding the second vector $V_{n+(m-1)/2}$ prior to taking the square root to find the estimated error vector for bit time n.

7. In a ground based mobile channel, a method of coherent recovery of digital data encoded in the phase of a phase shift keyed signal modulated on a carrier comprising the steps of:

(a) receiving the phase shift keyed signal modulated on a carrier and demodulating the signal using a local oscillator signal as a reference to provide inphase and quadrature components of the demodulated signal;

(b) providing digitized samples of the inphase and quadrature components of the demodulated signal of step (a) representative of the demodulated signal at each bit time to provide digitized inphase and quadrature components of a first vector having a phase responsive to (i) an information-bearing phase component of the received signal, (ii) the phase difference between the local oscillator signal and the carrier of the received signal, and (iii) interference and noise;

(c) squaring the first vector to provide a second vector having twice the phase angle of the first vector;

(d) inverting every other second vector by inverting the second vector every odd bit time;

(e) for each successive bit time n, finding an estimated error vector by taking the square root of the average of a number m of second vectors from samples taken before and after the sample for bit time n using where applicable the inverted vectors of step (d);

(f) dividing the first vector $V_n$ of step (b) for each bit time n by the estimated phase error vector of step (e) for bit time n to provide a third vector;

(g) decoding the third vector for each bit time to obtain a bit of data the digital data.

8. The method of claim 7 wherein step (f) is accomplished by multiplying the first vector $V_n$ of step (b) for each bit time n and the conjugate of the estimated phase error vector of step (e) for bit time n to provide the third vector.

9. The method of claim 7 wherein step (g) is accomplished by multiplying the estimated phase error vector of step (e) for bit time n by the conjugate of the estimated phase error vector of step (e) for bit time n−1 to at least find the sign of the real part of the vector product, and detecting the phase of the third vector for each bit time to obtain a bit of data, including inverting the respective bit if the real part of the vector product of the estimated phase error vector for bit time n and the conjugate of the estimated phase error vector is negative.

10. The method of claim 7 wherein the number m is a predetermined number.

11. The method of claim 7 wherein the number m is adaptively determined based on at least one detected characteristic of the mobile channel.

12. The method of claim 7 wherein the estimated error vector is found by taking the square root of the average of a number m of second vectors from samples taken during successive bit times before and successive bit times after the samples for bit time n.

13. The method of claim 7 wherein the estimated error vector is found by taking the square root of the average of a number m of second vectors from samples taken during successive bit times before and successive bit times after the samples for bit time n and includes the samples taken at bit time n.

14. The method of claim 13 wherein, for each set of simultaneously taken samples, the estimated error vector for bit time n is computed from the estimated error vector for bit time n−1 by (i) subtracting from the average of step (e) for bit time n−1, the second vector V for bit time $$\left( n - \frac{m-1}{2} \right) - 1,$$

and (ii) adding the second vector $$V_{n+(m-1)/2}$$

prior to taking the square root to find the estimated error vector for bit time n.

15. The method of claim 7 wherein the mobile channel is a Gaussian minimum shift keying digital communication channel.

16. The method of claim 15 wherein the step of decoding the third vector includes the steps of:

(i) for even bit times, determining the bit value based on the real component of the third vector;

(j) for odd bit times, determining the bit value based on the quadrature component of the third vector.

\* \* \* \* \*